United States Patent [19]
Blose et al.

[11] Patent Number: 5,348,350
[45] Date of Patent: Sep. 20, 1994

[54] PIPE COUPLING

[75] Inventors: Thomas L. Blose, Houston, Tex.;
David L. Britten, Calgary, Canada

[73] Assignee: Ipsco Enterprises Inc., Wilmington, Del.

[21] Appl. No.: 770,567

[22] Filed: Oct. 3, 1991

Related U.S. Application Data

[63] Continuation-in-part of Ser. No. 467,620, Jan. 19, 1980, abandoned.

[51] Int. Cl.⁵ .............................................. F16L 25/00
[52] U.S. Cl. ...................................... 285/94; 285/328; 285/334; 285/334.4
[58] Field of Search .................... 285/334, 334.4, 94, 285/355, 390, 917

[56] References Cited

U.S. PATENT DOCUMENTS

| Re. 30,647 | 6/1981 | Blose . | |
|---|---|---|---|
| 1,875,708 | 9/1932 | Couhig | 285/355 |
| 2,818,343 | 11/1939 | Reimschissel | 285/917 X |
| 2,893,759 | 7/1959 | Blose | 285/334 |
| 3,224,799 | 12/1965 | Blose et al. | 285/334 |
| 4,192,533 | 3/1980 | Blose . | |
| 4,600,224 | 6/1984 | Blose . | |
| 4,736,967 | 4/1988 | Mott et al. | 285/334.4 X |
| 4,830,411 | 5/1989 | Tsura | 285/334 |
| 5,007,665 | 4/1991 | Bovisio et al. | 285/334 |

OTHER PUBLICATIONS

Paper: "Investigation of Premium Casing Connection for Canadian Thermal Recovery Wells" by M. W. Slack et al, dated May 2, 1988.

*Primary Examiner*—Dave W. Arola
*Attorney, Agent, or Firm*—Robert H. Barrigar

[57] ABSTRACT

A pipe coupling or connection comprises a female coupling component and a mating male coupling component. Each component is matingly threaded for coupling engagement, and each is provided with an adjacent frusto-conical sealing surface. The sealing surface is provided with a controlled surface roughness, viz. very shallow fine surface variations, preferably formed as microgrooves at a pitch small relative to the pitch of the threads. The slope of the frusto-conical surface of the sealing area of the male component is slightly mismatched with that of the sealing area of the female component to simulate the bearing force vs. axial distance characteristic of shrunk-fit circular cylindrical sealing surfaces. The slight mismatch enables the sealing pressure to be above a design minimum throughout the entire sealing area yet higher at each end of the sealing area. As the coupling is assembled, thread interference in the vicinity of the sealing surface lags the occurrence of interference between the sealing surfaces. Load threads are provided with negatively inclined load flank faces.

30 Claims, 4 Drawing Sheets

(CYLINDRICAL)

(EQUAL, GENTLY SLOPED TAPERS)

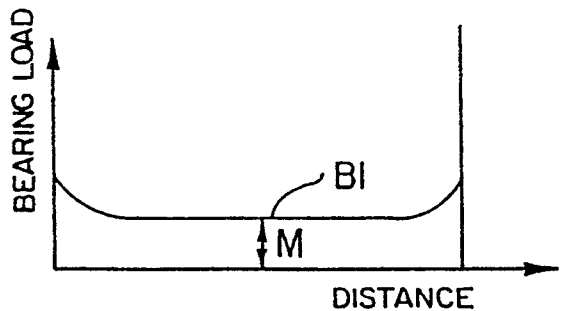
FIG. 9A
FIG. 9B (UNEQUAL, SLIGHTLY MIS-MATCHED GENTLY SLOPED TAPERS.)
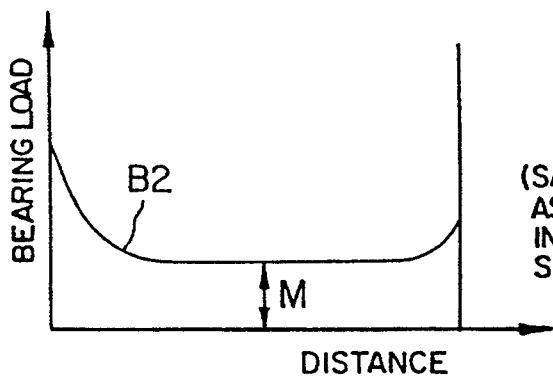
FIG. 9C (SAME SEALING SLOPE MISMATCH AS FOR FIG. 9A, BUT WITH THREAD INTERFERENCE LAGGING SEALING SURFACE INTERFERENCE.)
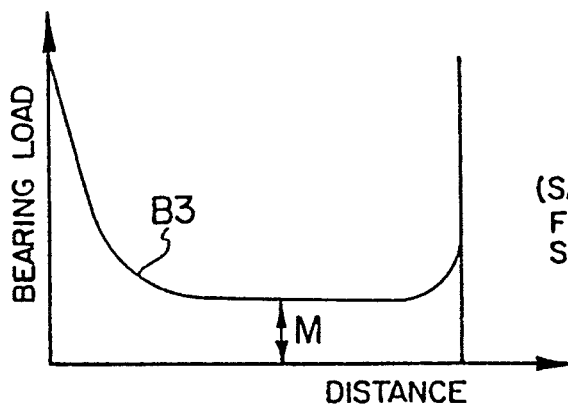
FIG. 9D (SAME PARAMETERS AS FOR FIG. 9C, BUT WITH SLIGHT THREAD SLOPE MISMATCH.)

(EQUAL, STEEPLY SLOPED TAPERS)

(UNEQUAL, GREATLY MISMATCHED TAPERS)

PIPE COUPLING

RELATED APPLICATION

This application is a continuation-in-part of application Ser. No. 07/467620 filed on Jan. 19, 1990 and now abandoned.

This invention relates to couplings or connections for use in interconnecting lengths of pipe casing or tubing made of steel or the like. In the following description, both terms "coupling" and "connection" are used, usually interchangeably without preference, it being understood that the invention applies equally to threaded and coupled connections and to pin and box members integral with the pipe and interconnecting lengths of pipe.

BACKGROUND, PRIOR ART

In some applications, steel tubing is subjected to severe stresses, and where a series of lengths of pipe or tubing have to be coupled together, the connection or coupling itself must be able to bear the applied stresses. For example, for use as oil well casing, such tubing may be used in conjunction with steam injection into the well where temperatures of the order of 650 degrees Fahrenheit may be reached. This subjects the tubing to compressive and tensile axial loads approaching or even exceeding the actual yield strength of the material in the pipe body. Thus, any connection or coupling for joining together successive lengths of pipe must be able to withstand the axial loading without failure and still be resistant to leakage from internal pressures approaching the actual yield strength of the pipe body. As the pipe is alternately heated and cooled, the axial loading on the pipe and couplings may become alternately compressive and tensile, and throughout the coupling must maintain its seal with the pipe ends in resisting internal pressure.

Such couplings (connections) comprise a male and mating female coupling component. The male component is a suitably configured threaded portion at at least one end of the steel pipe, constituting the pin member of the coupling. A mating annular female component long enough in the axial direction to receive the pin ends of two adjoining lengths of pipe is internally configured and threaded at each end for mating engagement with the pin member, thereby completing the coupling. The annular female element is often referred to as the box element or box member of the coupling. Equally, one end of the pipe could be upset and internally threaded to constitute the female component of the connection.

Conventionally, the pin member of the coupling or connection is tapered inwardly from the proximal end of the threaded portion to the distal end to mate with a similarly tapered female threaded member of the coupling. The taper facilitates entry of the pin member into the box member.

In pipe couplings, a seal is typically maintained. The seal may be effected between the mating threaded portions of the pin member and the box member of the coupling, but this kind of seal is subject to ready leakage. In other couplings, some auxiliary sealing element (e.g. an annular elastomer) is provided. In yet other couplings of which the present invention is a species, the axial load-bearing threaded portions of the coupling do not themselves necessarily provide a seal; the seal is a separate metal-to-metal seal provided adjacent the axial load-bearing threaded portions, in both the pin and the box members of the coupling, or male and female elements of the connection.

The threaded axial load-bearing portion of the coupling (or connection) should conform to certain known design principles. The total axial bearing surface provided by the full-depth load-bearing threads should be at least equal to the cross-sectional area of the pipe material. The angle of orientation of the stab flanks of the axial load-bearing threads should differ from the angle of orientation of the load flanks by not less than about 15 degrees. The step height of the axial load bearing threads should be greater than the thread radius so as to avoid galling (metal abrasion). Tilt of the distal end of the pin that causes the yield strength of the steel to be exceeded is generally to be avoided. Other general principles of thread design and coupling design will be known to those skilled in such design work and should be applied to the design of the connection of the present invention.

Couplings are known in which the angle of orientation of the load flank of the axial load-bearing threaded portion is negative.

Couplings are further known in which a metal-to-metal seal is provided. For best results, such surfaces should have a controlled degree of roughness, as by shot peening, grit blasting, glass bead peening, or helical microgroove threads having a pitch very small relative to the pitch of the load-bearing coupling threads.

Problems exist in known pipe couplings. Especially, the pin end of the pipe is often subjected to rough handling with consequent damage to coupling and sealing surfaces. A pipe coupling should be able to function effectively if there has been slight damage to the pin. This could be accomplished if the sealing force were designed to be above some predetermined minimum throughout the effective sealing area, and is well above the minimum value at each end of the sealing area. Then, if either end (or some point in between) of the sealing area were slightly damaged, the seal at one end of the sealing area at least would provide an adequate seal. But many prior couplings having metal-to-metal sealing areas adjacent the threaded coupling areas typically provide a minimum or even less than minimum design sealing force at one end of the coupling and a maximum (above design sealing force) at the other. So if that part of the sealing area in which the sealing force is designed to be maximum is damaged, the effective overall effective sealing force may be only the design minimum sealing force, or conceivably even less than the design minimum. This may be insufficient to prevent leakage under extreme operating conditions.

SUMMARY OF THE INVENTION

The pipe coupling or connection according to the invention overcomes the foregoing problem by providing a metal-to-metal seal in which the sealing force is well above the design minimum at each end of the sealing area and at or above the design minimum throughout the sealing area.

A pipe coupling or connection according to the invention is of the type comprising a female coupling component and a male coupling component, each matingly threaded for coupling engagement, and each provided with a sealing area adjacent the coupling threads (load threads). The sealing area of each coupling component is formed as a frusto-conical surface, at least one and preferably both surfaces being slightly imperfect. Such surface is imperfect in the sense that it has a controlled surface roughness. In other words, it is provided over its surface with very shallow, closely spaced fine surface variations or irregularities, as are formed for example by shot or glass bead peening, etching, grit blasting, or by threading with microgrooves at a pitch very small relative to the pitch of the coupling threads. The degree of surface roughness chosen will depend upon the application. For example, to avoid gas leakage, the surface irregularities or degree of roughness should by very fine. In drilling mud, a coarser surface finish may be satisfactory. As thus far described, the structure is conventional.

The coupling or connection according to the invention differs from known couplings in that it has the following combination of characteristics, or such of them as may pertain to the achievement of the design objective at hand:

1. The seal taper angle is of a low gradient, and there is a slight mismatch between the pin seal taper and the box seal taper, the box seal taper being slightly steeper than the pin seal taper, so as to obtain a sealing force distributed over the sealing area that simulates that of a shrink-fit cylindrical seal.
2. As the coupling is made up (assembled), interference of the pin and box sealing areas occurs at least about as soon as, and preferably before there is any interference between the load threads of the pin and box members in the vicinity of the sealing areas, ("Interference" in this context means interference tending to pry apart the frusto-conical sealing surfaces of the pin and box—i.e. interference creating a radial force between these sealing surfaces).
3. The load flanks of the load threads are negatively inclined.
4. The sealing areas are coated with a high-temperature graphite particle-containing lubricant with a relatively high content of solid graphite particles, or similar such lubricant.
5. The coupling is provided with an "insurance" auxiliary seal operating when the pipe is in compression. (It may also operate for tensile loads up to some threshold value). The "compression" auxiliary seal is formed between a slightly negatively inclined annular seat formed by a torque shoulder at the proximal end of the box located inwardly of the sealing area, and the terminating distal radial surface of the pin.
6. The pin seal taper may desirably be at the same angle to the pin axis as the pin load thread taper. The box seal taper is thus preferably formed to be slightly steeper than the pin seal taper. The box load thread taper may be at the same angle to the box axis as the pin load thread taper, or may be slightly shallower, as proposed in copending application Ser. No. 07/770,566, filed concurrently herewith.

These various characteristics of the pipe coupling of the invention will now be discussed in more detail.

1. Pipe couplings are previously known in which the box seal taper is steeper than the pin seal taper. It is known that such mismatch facilitates initial contact and deflection ("tilting") of the pin nose as it engages the box sealing surface during assembly, and tends to reduce the overall seal area, concentrating the pressure loading of the sealing area over a relatively small portion of the available sealing surface in the vicinity of the distal end of the pin, as disclosed for example in Mott U.S. Pat. No. 4,736,967, granted Apr. 12, 1988.

Mott discloses a seal taper differential between box and pin, but does not discuss seal taper relative to thread taper. Nor does Mott discuss any preferred relationship between such tapers and the grade of steel used.

Furthermore, Mott does not teach a pin/box sealing area mismatch that provides an axial distribution of sealing force over the sealing area simulating that which would be obtained from shrink-fitting an internal circular cylindrical box sealing surface about a mating external circular cylindrical pin sealing surface. Such axial distribution is characterized by a relatively uniform sealing force (at or exceeding the design minimum) over most of the axial length of the contacting sealing surfaces, but having force peaks well in excess of the design minimum at both ends of the axial extent of the contacting sealing surfaces. These force peaks are desirable because they provide the greatest sealing force in the areas that are most sensitive to disturbance. At the distal end of the pin, there is a risk of damage due to careless handling. At the proximal end of the pin, there is the risk of seal separation due to out-of-tolerance load thread interference in the vicinity of the sealing area. So the availability of peak sealing forces at both ends of the sealing area tends to offset these risks.

The seal taper of both pin and box seals must be of relatively slight (shallow) gradient. This facilitates maintenance of a relatively long sealing area in the axial sense and ensures that the desired simulated shrink-fit cylindrical sealing characteristic is obtained. Further, it ensures that tilting of the distal end of the pin during assembly of the coupling will not be unacceptably severe, and that there is an adequate thickness of material at the distal end of the pin. (Some tilting of the pin end is desirable, because it provides the force peak at the distal end of the pin sealing area and causes some burnishing of that part of the sealing area to occur.)

Further, because there will be relative movement of box and pin sealing surfaces as a result of compression/tension thermal cycling of the pipe, it is important to maintain adequate contact between the sealing surfaces throughout the cycling. This cannot be accomplished if the taper is too steep.

The mismatch between the box and pin tapers must be sufficient to simulate the desired cylindrical shrink-fit seal characteristic, but should not appreciably exceed that degree of mismatch. Furthermore, the mismatch should not substantially interfere with the design objective of maintaining an adequate thickness of material at the distal end of the pin and of avoiding undue tilting of the distal end of the pin during assembly. This result can be achieved if the taper (in inches per inch) mismatch is kept less than the designed gauge-point nominal interference (in inches) between the box and pin sealing areas, at least for most oil well pipe. Preferably the mismatch should be about 60% of nominal interference, or at most about 70%. (For the sealing areas, the gauge point is preferably selected to be about midway between the beginning and end of the longer of the two sealing areas, the longer sealing area being that of the pin for manufacturing reasons, and at a nearby mating point of the shorter of the two sealing areas, viz, the female sealing area). As the degree of mismatch declines in the direction of equality of pin and box sealing surface tapers, the force peak at the distal end of the pin sealing area drops off relative to the force peak at the proximal end of the pin sealing area. This result may be tolerable for some applications, but it is preferred to have the mismatch sufficient to create a distinct substantial force peak at the distal end of the pin sealing area, since this objective tends to offset the possible reduction in sealing efficacy of that part of the seal that may be caused by slight damage to the distal end of the pin. Note that interference should increase if the grade of steel increases appreciably.

It is within the scope of the invention that only one of the mating sealing surfaces be roughened in the manner described, the other surface being smooth. That arrangement will still provide a good seal. However, it is preferable that both surfaces have a controlled surface roughness.

2. At the proximal end of the pin sealing surface, a force peak is desired when the coupling is made up (assembled). This objective will be defeated or impeded if there is too much load thread interference in the vicinity of the sealing area. We are here referring to the radial interference of box with pin threads adjacent the seal. Desirably the bearing force when the coupling is fully made up will tend to be concentrated at the proximal end of the sealing area (relative to the pin), rather than borne by the load threads in the vicinity of the sealing area.

Furthermore, it is desired that there be some burnishing of the sealing surfaces and mashing or compaction of the solid particles in the sealing lubricant during assembly. This objective cannot be achieved if interference between box and pin load threads prevents pressure contact between box and pin sealing surfaces during make-up.

If the simulation of the cylindrical shrink-fit seal load force characteristic is achieved, it follows that the load thread interference in the vicinity of the sealing area when the coupling is fully made up is not sufficient to pry apart the sealing surfaces of box and pin. But this design criterion is not in and of itself sufficient to achieve the latter of the two objectives mentioned above.

Accordingly the relative dimensions, configuration and angles of load threads and sealing surfaces should be chosen so that box/pin sealing surface interference occurs during make-up at least as soon as, and preferably before, load thread interference in the vicinity of the sealing area occurs. (Load thread interference in the vicinity of the proximal end of the pin load threading is less critical, since it will not usually have any appreciable tendency to pry apart the sealing surfaces of box and pin). The greater the lag of load thread interference following seal surface interference during make-up, the higher the concentration of sealing force at the proximal end of the pin sealing surface.

3. Although the provision of negative load flank angles on the load threads is a characteristic of some previously known couplings, the purpose of such provision has been to eliminate the sliding of the pin relative to the box so as to tend to disengage the box and pin when the pipe is under tension. In other words, the negative load flank angles are there to prevent the coupling from bursting apart when tensile stress is applied to the coupling.

It has not however heretofore been specifically taught that the combination of negative load flank angles with the other structural features mentioned above improves the seal, in that it resists any tendency of the sealing surfaces to be pried apart when the coupling is placed under tension.

The load flank faces should be slightly negatively inclined relative to the radial direction, an angle of the order of $-5$ degrees (depending upon pipe diameter and thread depth) typically being suitable. The stab flank faces of the coupling threads are then formed at a positive angle to the radial, and, as mentioned earlier, the sum of the stab flank angle to the radial and the load flank angle to the radial should not be less than about 15 degrees. So the stab flank angle could be a minimum of about $+20$ degrees, assuming a load flank angle not exceeding $-5$ degrees (in a negative sense).

4. As mentioned, the coupling seal designed in accordance with the principles of this invention tends to be optimum if a high-temperature high-solids graphite particle-containing lubricant or equivalent is applied to the sealing surfaces before make-up of the coupling. Lubricants employing solid metallic particles (e.g. copper) are not as satisfactory because it is difficult during the sliding of the box and pin sealing surfaces during make-up to compress or break up the metallic particles. Graphite particles are much easier to mash, and when they do, they tend to fill the hollows in the sealing surfaces. Even if the petroleum constituent of the lubricant is later lost as a result of high temperatures, the graphite remains to fill the voids and hollows between pin and box sealing surfaces.

5. Desirably, a torque shoulder is formed at the proximal interior portion of the box against which the mating distal end of the pin thrusts and seals when the coupling is fully made up. The face of this torque shoulder is preferably given a slight negative angle to impede any tendency of the distal end of the pin to deflect or deform in an inward radial sense, and to force it into preferred sealing engagement with the box.

Compression of the pipe coupling forces the distal end of the pin against the box torque shoulder, and if the facing surfaces are reasonably smooth and well-mated, a seal is formed that augments the seal formed by the contacting frusto-conical sealing surfaces of the box and pin.

6. The design of load thread tapers to provide a slight mismatch between box and pin thread pitch lines is more fully discussed in the aforementioned copending patent application Ser. No.07/770,566. The pin thread taper should, to achieve the desired increase in bearing load at the proximal pin sealing surface, be slightly steeper than the box thread taper.

However, the coupling design according to the invention has significant merit in comparison with previous designs even if there is no thread taper mismatch. The pin thread taper and box thread taper can be identical. In that case, manufacturing convenience dictates that the pin sealing surface taper should preferably be identical with the pin thread taper, and the seal mismatch effected by designing the box sealing surface taper to be steeper than the pin sealing surface taper.

The coupling threads (load threads) of the male and female components may be formed along thread pitch lines whose surfaces of revolution form mating frusto-conical surfaces (i.e. the thread pitch lines are tapered for easy coupling). The slope of the frusto-conical surface along which the full depth coupling threads (load threads) of the male (pin) coupling element are formed should, for manufacturing convenience, preferably be equal to the slope of the frusto-conical sealing surface of the male coupling element. The female (box) element must of course be internally formed to mate with the male, subject to the slight mismatch of sealing surface slopes previously mentioned, and subject to the possibility of a slight mismatch between the slopes of the box and pin load threads, as described in more detail in copending application Ser. No. 07/770,566, filed concurrently herewith.

Note that the coupling threads of the male and female (pin and box) members of the coupling or connection do not necessarily provide a seal; the interference can be designed to be relatively low. Clearance should be provided between the crest of the pin threads and the root of the box threads, but some interference between the root of the pin threads and crest of the box threads, in accordance with conventional practice., may be designed.

Alternatively, interference may result from a slight mismatch of box and pin load threads, as discussed in the aforementioned copending application Serial No. 07/770,566.

The foregoing characteristics of the connection/coupling of the invention, afford a useful bearing load-versus-length relationship simulating that of a shrink-fit cylindrical seal over the length of the sealing portion that is characterized by relatively high bearing load at either extremity of the sealing portion of the pin and box members, and somewhat lower bearing load (but at least as high as design minimum) intermediate the two ends of the sealing portion, when the box member has been fully threaded onto the pin member. What is considered to be a sufficient axial length of the sealing area will be dependent upon such parameters as pipe diameter, grade of steel, wall thickness variation, etc. For most pipe suitable for use in oil well applications, a pin sealing area of the order of one inch in length and a box sealing area of approximately half or more of the length of the pipe sealing area will be found to be satisfactory.

The foregoing characteristics ensure that a very good seal is maintained at both ends of the sealing portion if the coupling and sealing surfaces of the pin and box members are relatively undamaged. There is, as mentioned, a risk of some surface damage, particularly at the distal end of the pin member. If that damage prevents the distal end of the pin member from engaging the mating (but slightly mismatched) sealing portion of the box member with a sufficiently high bearing (sealing) force, there will still be adequate bearing force at the proximal end of the sealing area of the pin portion when the pin engages the mating box member, and thus, there will be adequate bearing pressure at least at one end of the sealing area to form an adequate seal.

Note that a greatly mismatched taper of pin member relative to box member sealing surfaces would give a high bearing (sealing) load at the distal end of the pin member but a relatively low bearing load at the proximal end of the pin member. This is undesirable, especially because the risk of damage is highest to the distal end of the pin. Also relatively undesirable is the case of identical tapers of pin and box members, affording a high bearing (sealing) load at the proximal end of the pin member, the bearing load diminishing toward the distal end. The invention should be implemented between these two extremes.

For most oil well pipe, to ensure that the mismatch is within acceptable limits, as mentioned above, the slope of the box member sealing area over a unit length should exceed that of the pin by less than the nominal interference between the threaded sealing areas at or near the gauge point. This would be a preferred characteristic for pipes of 3.5 inches to about 16 inches in diameter, and having contacting sealing areas of at least about ⅜ inch.

A further preferred characteristic of the connection or coupling according to the invention is that the relatively long and low-angled sealing surfaces have sufficient interference at the gauge point of each member to be greater than the pressure differential for which the connection or coupling has been designed (which according to the preferred embodiment, and in accordance with conventional design practice, is 100% of yield strength of the pipe body) regardless of the bearing load at either end of the sealing threaded portion, when either axial tension or axial compression loads are applied to the coupling.

The preferred low-angled sealing area design, of the pin element especially, is beneficial in that during handling, if there is any damage, e.g. from stabbing the pin into the box, any unwanted protrusions or other damaged parts of the distal end of the pin may be hand dressed, i.e. filed off or ground off without any appreciable diminution of the efficacy of the coupling. The proximal end of the pin in engagement with the mating coupling threads of the box can be expected to have a sufficiently high bearing load that such load will exceed the pressure differential for which the coupling has been designed, even at full pipe yield pressures.

BRIEF DESCRIPTION OF THE DRAWINGS

FIGS. 8A through 12B are a series of graphs and schematic views of the relative degrees of taper of pin and box sealing areas of the pin and box members of the coupling according to a preferred embodiment of the invention (FIGS. 9A through 9D), such preferred embodiment being presented in FIGS. 1 to 6, when the pin member has fully engaged the box member, as compared with alternative configurations whose characteristics are shown in the remaining ones of these figure. The dimensions, slopes and mutual spacing of the pin and box sealing areas have been exaggerated for ease of comprehension. The orientation of FIGS. 8A through 12B is the same as that of FIGS. 1 and 2, with the distal end of the pin to the right, and the proximal end of the pin to the left.

FIG. 8A is a graph showing a desirable shrink-fit circular cylindrical seal bearing load vs. distance characteristic.

FIG. 9A is a graph showing a representative seal bearing load vs. distance characteristic for the seal of a coupling or connection designed according to the principles of the invention, where thread interference in the vicinity of the sealing area begins about simultaneously with seal surface interference, as the coupling is being made up, and where box thread taper is the same as pin thread taper.

FIG. 9B schematically represents the slightly mismatched gently sloped tapers of box and pin sealing surfaces according to the invention, giving rise to the graphs of FIGS. 9A, 9C and 9D.

FIG. 9C is a graph showing a representative seal bearing load vs. distance characteristic for the seal of FIG. 9B, but where thread interference in the vicinity of the sealing area lags the occurrence of sealing area interference as the coupling is being made up.

FIG. 9D is a graph showing a representative seal bearing load vs. distance characteristic for the seal of FIG. 9B as modified in the same way as for FIG. 9C, but with pin thread taper being slightly steeper than box thread taper.

FIG. 12B schematically represents the box and pin sealing area relationship giving rise to the characteristic depicted in FIG. 12A.

DETAILED DESCRIPTION OF THE INVENTION

Figure 1:
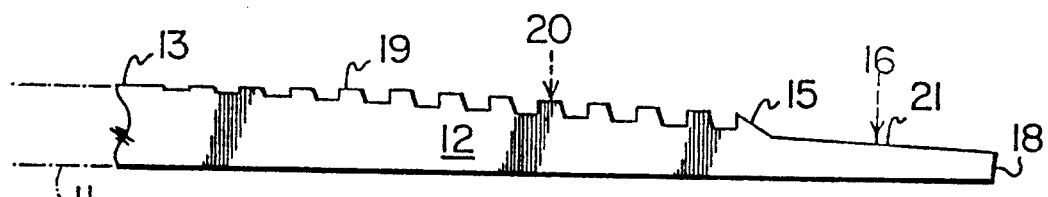
FIG. 1 is an axial partial section view of a pin member wall constructed in accordance with the invention, at the end of a length of pipe, as seen through the pipe wall, showing the coupling threaded portion and adjacent sealing portion for engaging a mating box member of the coupling.

The end of a steel pipe, tube or casing 11 is formed to provide a pin generally indicated as 12. Pin 12 has a threaded portion 19 beginning at a chamfered starting thread 15 located at a position short of the distal end 18 of the pipe 11 and extending axially therefrom to terminate in a vanish point 13. The thread pitch line of threaded portion 19 of the pin 12 is sloped inwardly from its proximal end at vanish point 13 toward its distal end. The pin 12 terminates in a frusto-conical sealing area 21 provided with a controlled surface finish to provide a limited degree of roughness, e.g. helical microgrooves formed by way of threading, as more particularly illustrated in FIG. 7. The angle of slope of the sealing surface 21 along the frusto-conical surface is equal to that of the thread pitch line of the threaded portion 19.

It will be noted that in FIG. 1, the depth of the roots, and the height of the crests of the threads of threaded portion 19 relative to the roots of the threads, of pin 12 increases from the vanish point 13 to a maximum about midway along the axial length of coupling portion 19, well before reaching the starting thread 15. As illustrated, seven of the threads are perfect threads.

Figure 4:
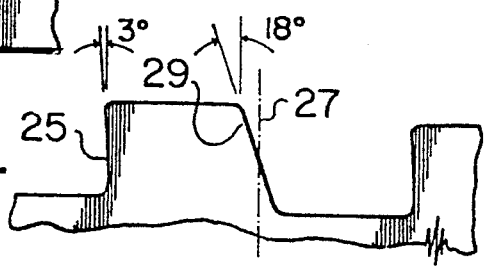
FIG. 4 is a detailed enlarged partial axial section view of the pin thread of FIG. 1, taken at the gauge point.

It can be seen from referring to FIG. 4 that the load flank face 25 of the pin threads is negatively inclined at a very slight angle, shown as approximately $-3$ degrees, to the radial plane 27. This load face angle orientation is maintained throughout the entire threaded portion 19 of pin 12. The angle of inclination of the load flank face chosen will vary with choice of thread height, but can generally be expected not to exceed (in a negative sense) $-10$ degrees even for very shallow threads.

It can also be seen from FIG. 4 that the stab flank face 29 of the pin threads has a positive angular orientation relative to the radial plane 27. According to preferred design practice, the difference in angle between the orientation of the load flank face 25 and the stab flank face 29 should not be less than about 15 degrees. So if, for example, the load flank face 25 is at a negative angle of $-3$ degrees, then the angle of orientation of stab flank face 29 should not be less than about 18 degrees. The stab flank face angle or orientation is also maintained uniformly throughout the length of the threaded portion 19 of the pin member 12.

Figure 2:
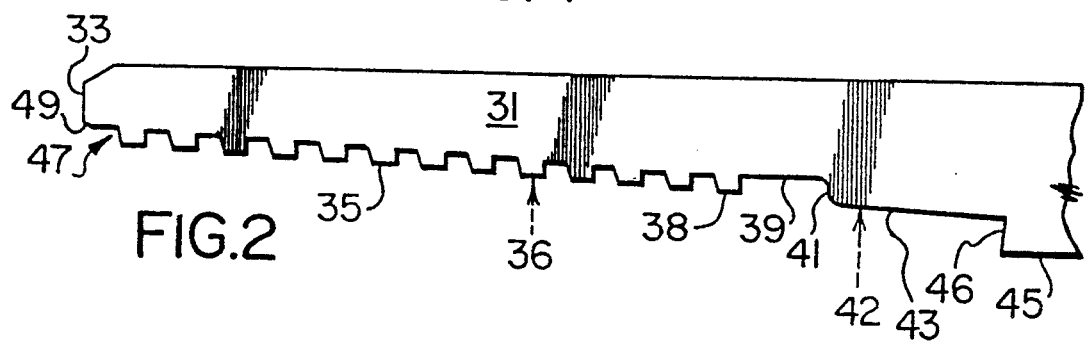
FIG. 2 is an axial partial section view of a wall portion of the mating female or box member of a coupling according to the invention showing the coupling threaded portion and sealing threaded portion for receiving the pin member of FIG. 1.

Referring to FIG. 2, the box 31 of which half of a complete wall length (in the axial direction) is illustrated in FIG. 2, is internally configured and threaded to mate with the pin 12 of FIG. 1. The other half of box 31 (not illustrated) is similarly internally configured and threaded to receive the pin of the next length of pipe. In an integral connection, the pin could be formed as illustrated in FIG. 1, the female end as illustrated in FIG. 2 (or FIG. 3, as an alternative to FIG. 2).

Specifically, the female coupling element 31 is provided beginning at its distal end 33 with a threaded portion generally indicated as 35 extending into the interior of box member 31 as far as a terminating thread 38. Further inwardly from thread 38 is a gap functioning as a single-point threading tool relief groove, generally indicated as 39, terminating in a shoulder 41 which defines the outermost limit of an interior frusto-conically shaped, microgroove sealing surface generally indicated as 43, which terminates in a limit or torque shoulder 45 forming a negatively inclined annular seat 46. The negative inclination of seat 46 tends to prevent the pin end 18 from climbing over the shoulder 45 when excess torque or high axial loading is applied to the coupling.

Although the threaded portion 35 of box 31 and the sealing surface 43 of box member 31 are both tapered so as to receive in coupling and sealing engagement the mating pin 12 of FIG. 1, nevertheless the degree of taper of the interior sealing surface 43 of box 31 is deliberately chosen to be slightly steeper than the degree of taper of the mating sealing surface 21 of pin 12. The reason for this is to provide a preferred bearing load-versus-length relationship, as discussed above and to be discussed in greater detail below with reference to FIGS. 9A and 9B.

Figure 5:
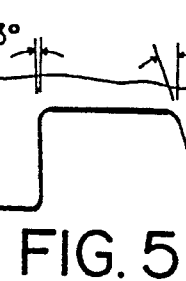
FIG. 5 is a detailed enlarged partial axial section view of the box thread taken at the gauge point of the box of FIG. 2.

The threads 35 (load threads) of box 31, shown in enlarged profile in FIG. 5, are angled to mate exactly with the threads of pin 12. Further, the thread pitch line of threads 35 is at least approximately that of threads 19. In other words, the surfaces of revolution of the thread pitch lines for the coupling threads of the male and female coupling components are mating or nearly mating frusto-conical surfaces. (They may be slightly mismatched, as described in the aforementioned copending application Ser. No.07/770,566). The box thread is deeper than the pin thread so as to afford the necessary thread clearance. Their respective dimensions are better understood by referring to FIG. 6.

Figure 6:
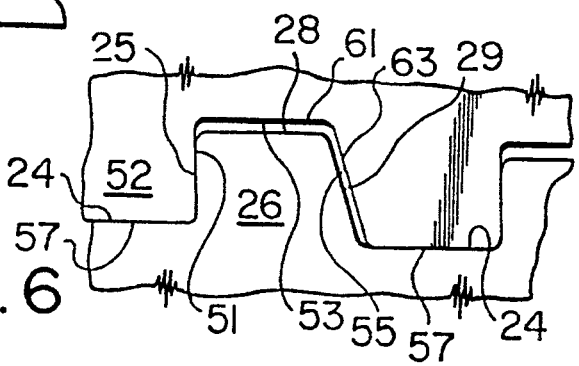
FIG. 6 is a detailed enlarged partial axial section view of the coupling thread of FIG. 4 shown engaging the coupling thread of FIG. 5, under load, assuming equal taper of pin and box load thread (i.e. having the same thread pitch line).

It can be seen from FIG. 6 that a representative load flank face 25 of a representative pin thread 26 is in flush engagement with a mating load flank face 51 of a thread 52 of box 31. Between the crest 28 of thread 26 and root 53 of the mating box member threaded portion 35 is a clearance gap 61. Further, there is a clearance gap 63 between stab flank face 29 of thread 26 and mating stab flank face 55 of mating threaded portion 35 of box 31. On either side of thread 26, it can be seen that the crests 57 of the box threads 35 are in flush engagement with the root faces 24 of pin coupling threads 19.

In other words, there is interference and flush engagement between the crests of the box thread and roots of the pin thread, and compressive interference between the load flank faces of box and pin threads (when the threads are fully engaged and normal tensile stress occurs in the coupling). In the same condition, there is clearance between the pin thread crests and box thread roots and clearance between the stab flanks of the box and pin threads. Note, however, that if the coupling were not stressed in tension but instead were stressed in compression, the stab flank faces rather than the load flank faces of the pin and box threads would become in load-bearing contact with one another.

Figure 3:
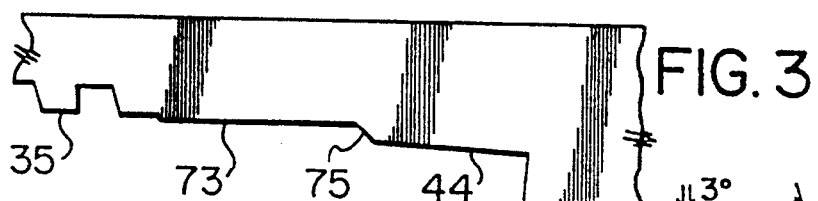
FIG. 3 is a partial view in axial section of a modified alternative construction of the wall portion of the box member modified to permit chaser manufacture of the box threads, and otherwise conforming to the box structure of FIG. 2.

FIG. 3 illustrates an alternative structure for the interior of the box member. In FIG. 2, the coupling threaded portion was shown to terminate in a final thread crest 38, followed by a thread relief groove 39, followed by a curved shoulder 41, and sealing surface 43. By contrast, the relief groove 39 is omitted in the FIG. 3 alternative embodiment, and instead, there is a thread run-off area 73 intermediate the end of the coupling threaded portion 35 and the sealing surface 44, merging with surface 44 via a curved shoulder transition portion 75. The sealing surface 44 of FIG. 3 is substantially identical to the sealing surface 43 of FIG. 2, with the qualification that the total axial distance occupied by the sealing surface 44 of FIG. 3 is somewhat shorter than the total axial distance occupied by the sealing surface 43 of FIG. 2.

While the FIG. 3 embodiment has less total sealing area than the FIG. 2 embodiment, nevertheless the FIG. 3 embodiment is easier to manufacture using a chaser technique, using the same tool bit (requiring no withdrawal of one tool bit and insertion of a separate tool bit). The sealing surface 44 can, using the chaser technique, be machined first as a helical microgroove surface, immediately followed by the machining of the threaded portion 35, without withdrawing the tool. The FIG. 2 embodiment does not admit of this possibility, but would require three separate tool bits to cut the threads, the thread relief groove, and the sealing area respectively, assuming that microgrooves are formed on the sealing area.

In this specification, reference will occasionally be made to the gauge point of the load threads and of the sealing surfaces of both pin and box. This is the point at which nominal design values are selected for whatever parameters pertain to such point. For example, the nominal interference value designed for the coupling is selected relative to the gauge points of the box and pin—the sealing surface gauge points for seal interference, the load thread gauge points for thread interference.

The selection of the gauge point is arbitrary to some extent, but ordinarily conveniently chosen as some intermediate point rather than a terminating point (of sealing surface, or threading, as the case may be). Suitably selected gauge points are shown schematically in FIGS. 1 and 2. Pin thread gauge point 20 is selected to be at or near the mid-point of the range of perfect threads on the pin. Box gauge point 36 is selected to be approximately aligned with pin gauge point 20 when the coupling is made up. Pin seal gauge point 16 is selected to be in the vicinity of the mid-point (axially) of the effective pin sealing surface. Box seal gauge point 42 is selected to be approximately aligned with pin seal gauge point 16 when the coupling is made up.

In use, the pin 12 of FIG. 1 is stabbed into the opening generally indicated as 47 of the box 31. Pin 12 is thrust in sufficiently far that contact is made between the starting thread 15 and a contacting thread surface of the threaded portions 35 of box 31, following which engagement of the threaded portions 19, 35 of pin 12 and box 31 respectively begins. The box 31 is then rotated relative to pin member 12 or vice versa so as to screw the pin member 12 into the box member 31. Rotation of the box member 31 relative to pin member 12 continues until the limit of the threaded portions is reached and the coupling threaded portion 19 of pin member 12 fully engages the mating coupling threaded portion 35 of box member 31. Rotation is effectively terminated when distal end 18 of pin 12 comes into pressure contact with annular seat 46 of box 31. This contact, assuming that the distal end 18 of pin 12 matingly seats against torque shoulder 45 in annular seat 46, will tend to form an effective auxiliary seal when the coupling is under compression or in tension up to some threshold tensile load.

Before this point is reached, the sealing portion 21 of pin 12 will have commenced engagement with the mating (but slightly differently tapered, as mentioned above and discussed in further detail below) interior sealing surface 43 (or 44) of box 31. If the sealing areas are surface-roughened by microgroove machining, it is apparent that the pitch of the microgrooves on sealing surfaces 21, 43 of pin 12 and box 31 respectively must be very much smaller than the pitch of the threaded coupling portions 19, 35. It follows that the microgrooves on pin 12 will skip relative to the microgrooves of box 31, as the box 31 is screwed onto pin 12. This action generally will not damage the sealing surfaces 21, 43 appreciably, but will tend to smooth out any surface irregularities and will also, if a sealing compound has been applied to the sealing surfaces, tend to spread the sealing compound over the sealing surfaces and cause entrapment of the sealing compound by depressions in the mating sealing surfaces 21, 43 of the pin 12 and box 31 respectively so as to facilitate formation of a large effective sealing area as between the microgroove sealing surface 21 and microgroove sealing surface 43. The entrapment of sealing lubricant will serve to protect against wear and will reduce any propensity of the sealing areas to gall destructively.

As mentioned previously, a high-temperature high-solids graphite particle containing sealing lubricant is preferably used. As the coupling is made up, the relative sliding action under pressure of the pin and box sealing surfaces tends to mash the graphite particles and force them to occupy the hollows and voids in and between the engaging sealing surfaces, promoting effective sealing.

According to the invention, the thread configuration, sealing surface configuration and designed interference are selected so that when the pin sealing surface 21 first makes interfering engagement with the box sealing surface 43, as the coupling is being made up, there has not yet been any undue interference between pin threads 19 and box threads 35 in the vicinity of the sealing surfaces 21, 43. (Such undue thread interference would undesirably prevent the desirable relative sliding action under pressure between the sealing surfaces 21, 43).

There need never be any interference between the pin threads 19 and box threads 35 in the vicinity of the sealing surfaces 21, 43, or at all, so far as creating an effective seal is concerned.

Figure 7:
FIG. 7 is a greatly enlarged detailed partial axial section view of a portion of a microgroove sealing area suitable for use as the sealing area of either the pin member or box member of FIG. 1.

The profile of a microgroove surface suitable for use as the controlled roughened surfaces of sealing areas 21, 43 of pin member 12 and box member 31 respectively is shown (in profile) in the partial section view of FIG. 7. The pattern is an undulate (wave) pattern with sharp narrow crests and relatively wide shallow concavely curved troughs. The pitch of the helical microgrooves 21, 43 on pin member 12 and box member 31 respectively is very small relative to the pitch of the coupling threaded portions 19, 35 of pin member 12 and box member 31. For example, it may be of the order of 0.01 inches per revolution, as compared with a pitch of 0.200 inches per revolution for the load threads, in the case of about 5 to 10-inch diameter pipe. The depth of the microgrooves (the distance between the peak of the crest and the root of the trough) will vary with the pitch and type of cutting tool chosen. The depth of surface irregularities may be expected to be anywhere from about 30 to 250 microns, depending upon application.

It is not essential that the surfaces of sealing areas be formed as helical microgrooves. Any similar undulate, mottled or roughened surface would suffice. The surface may be formed by any suitable technique such as acid etching, ball or glass peening, or grit blasting. What is required is a fine, shallow series of surface variations or irregularities that create very shallow hills and valleys, relatively finely formed on the frusto-conical surfaces. This kind of formation traps sealing compound and typically results in the prevention of galling of metal, as "hill summits" or crests yield as the pin is coupled to the box, thereby improving the seal by reducing the depth of the microgrooves or other depressions. The controlled surface roughening characteristics may depend upon application and environment. Gas-tight seals require a shallower depth of surface depressions than liquid-tight seals. It is obvious that the surface roughening should not create an axially extending trough (through which leakage could occur) from one end of the sealing area to the other.

FIGS. 8A through 12B illustrate graphically the effect of mismatching the tapers of the sealing portions of the pin and box respectively, by comparing alternative selections of relative box and pin taper. The figures with suffix letter B depict schematically in axial section, and with exaggeration of slope angles and dimensions, the opposing effective sealing areas of the pin and box, showing the complete axial length of mating sealing (e.g. microgroove) portions. Vertically aligned with each of these schematic depictions is at least one graph, the abscissa of which is the distance along the sealing area of the pin and box while the ordinate is the bearing load on the sealing surfaces when the pin has been fully screwed into the box. (At that point, the pin distal face 18 makes contact with annular seat 46 of the box 31.) The bearing load constitutes the sealing force, and is a measure of the efficacy of the seal.

Figure 8A:
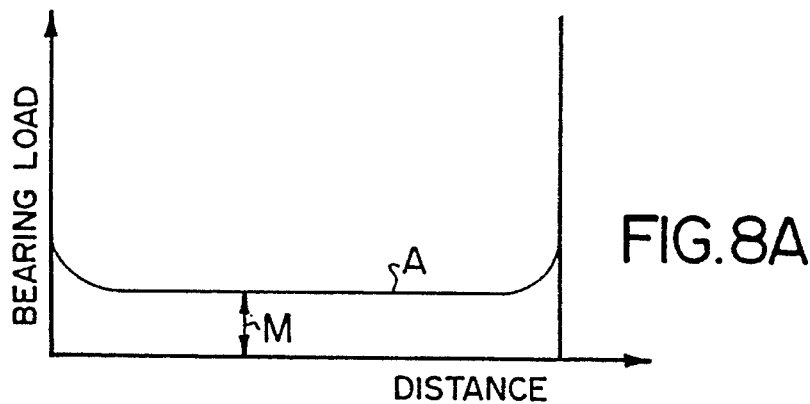
Figure 8B:
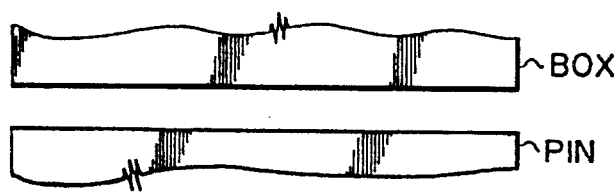
FIG. 8B schematically represents the box and pin sealing area relationship giving rise to the characteristic depicted in FIG. 8A.

If the tapers of the box sealing area and the pin sealing area are chosen to be identical, and zero, so that circular cylindrical sealing surfaces are presented, then the plot of bearing load against axial distance is that appearing in curve A of FIG. 8A. The interference as a consequence of the shrink-fit of box on pin is designed to be sufficient to provide a minimum bearing load M throughout the axial length of the mating sealing areas. The minimum value M is appreciably exceeded at the two ends. The FIG. 8A design is impractical, because engagement can be effected only by shrink fitting. But the characteristic curve A is a model to be emulated because of the load peaks at both ends of the sealing area and the uniform loading therebetween.

According to the invention, the slopes of the tapered pin and box sealing surfaces are selected to be gently angled and slightly mismatched, as appears schematically in FIG. 9B. In that case, the bearing load varies with axial distance over the sealing area according to curve B1 in the graph of FIG. 9A. The bearing load is at a design minimum M at an intermediate point along the sealing threaded portions of the pin and box and rises to a significantly higher value at both ends of the sealing threaded portion of the pin and box. This curve B1 is the best available simulation of curve A of FIG. 8A obtainable from any of the designs of FIGS. 9B, 10B, 11B, 12B.

It has been assumed in depicting the graph and physical arrangement of box and pin of FIGS. 9A, 9B that there is some thread interference in the vicinity of the sealing surfaces when the coupling is made up. If thread interference is deliberately designed to lag the occurrence of sealing surface interference by a considerable distance as the coupling is being made up, a superior result is obtained, viz. that of FIG. 9C. In that case, curve B2 is essentially similar to curve B1 over most of the axial distance along the sealing area, but curve B2 rises to a significantly higher bearing force value than does curve B1 in the vicinity of the proximal end of the sealing area relative to the pin. This extra measure of proximal-end sealing force tends to cause some burnishing of the sealing surfaces where that force is present and facilitates mashing of sealing compound also.

It is not necessary, even when the coupling is completely made up, that there be any thread interference in the vicinity of the sealing area. In such case, proximal pin sealing surface bearing load condiberably exceeds the bearing load that would result if adjacent thread interference were to lag sealing surface interference by only a slight delay during make-up ("delay" of course being used in a relative box/pin rotational movement sense, not in an absolute time sense).

If there is a slight mismatch between pin load thread and box thread taper, the pin thread taper being slightly steeper (more inclined to the axial) than the box thread taper, as taught in the aforementioned copending patent application Ser. No. 07/770,566, such that the thread taper mismatch facilitates the avoidance of thread interference in the vicinity of the sealing area, then the result is a further increase in the value of the bearing force (sealing force) at the proximal end of the sealing area relative to the pin. The result is graphically depicted in FIG. 9D.

Figure 10A:
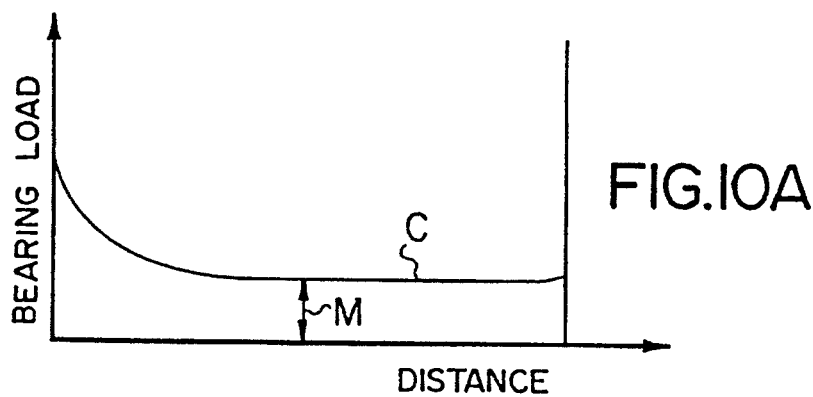
FIG. 10A is a graph showing a representative seal bearing load vs. distance characteristic for a coupling box seal/pin seal relationship in which both box and pin sealing surfaces have the same gently sloped taper.

If the tapers of the pin and box sealing surfaces are chosen to be equal but gently angled (FIG. 10B) then the bearing load against distance plot along the sealing area would appear as curve C in the graph of FIG. 10A. Bearing load would be highest at the proximal end of the effective pin sealing surface and lowest (not much higher than design minimum M) at the distal end of the pin sealing surface. While the design of FIG. 10B has some value, it affords uncomfortably little margin at the distal pin end to accommodate variations in tilt of the pin sealing area that result from manufacturing tolerances. There is also a risk that the pin distal end bearing load may fall below design value M.

The term "tilt" used in the jargon of pipe connections refers to the change in pin seal taper occurring at the distal end of the pin upon assembly of the pin into the box. Because of the taper of the pin, the pin wall tends to become thin at the distal end, and of course the steel is elastic, so the distal portion of the pin wall deforms (strains) as the pin is threaded into tight engagement with the box. The degree of tilt will depend upon pipe diameter, interference, starting taper, seal area length, etc. If, because of manufacturing tolerances of the design of the tapers selected, the tilt of the pin is greater than expected, the sealing force (bearing force) at the distal end of the pin may fall below design minimum value M if the FIG. 10B configuration is selected, but this is not likely if the FIG. 9B configuration is selected.

Some tilt of the distal end of the pin is desirable during make-up of the coupling, since that tends to facilitate mashing of the sealing lubricant solid particles and burnishing of the sealing surfaces. But too great a tilt, which can be caused by too great a mismatch between box and pin sealing surfaces, can cause undesirable strain of the distal end of the pin beyond the yield strength of the steel, in turn causing permanent deformation and possible loss of distal end bearing load.

Note that because both box and pin seal surface tapers are relatively shallow, the interference between box and pin sealing surfaces does not unacceptably increase as the coupling is made up. As the pin advances into the box, although the force between the pin and the box due to interference increases, that force is borne by an axially longer sealing area as the pin advances. Consequently, the point-to-point forces do not become unacceptably large. Eventually as the pin advances towards its final point of contact against the torque shoulder of the box, there is some tilting of the distal end of the pin, which of course relieves the stress on the tilted portion.

The choices of interference, degree of tilt, and box and pin tapers, will vary according to the designer's preference, and due regard will be paid to the grade of steel employed. As the grade increases, the designer may wish to increase the angle of the box taper relative to that of the pin. This will tend to ensure that the distal end of the pin maintains a tight contact with the torque shoulder of the box and will not disengage as the coupling if finally made up. Higher grades of steel have the capacity to absorb more energy from increased interference than lower grades, and thus can tilt further than would be the case for lower grades of steel. Typically the box taper chosen will be from about 3° to 4° for grades of steel of yield strengths from 40,000 to 80,000 psi, and the taper angle will be from 4° to 5° for grades of steel having yield strengths from about 80,000 to 150,000 psi. The 150,000 psi material will require more interference than say 50,000 psi material. The increased interference prevents the distal end of the pin from moving out of engagement with the box. It is important that internal pressure of gas (say) within the pipe coupling should not penetrate between the sealing surfaces to attempt to pry them apart. The coupling design according to the present invention is relatively free from such risk because of the significant amount of tilting of the distal end of the pin that occurs upon make up.

Figure 10B:
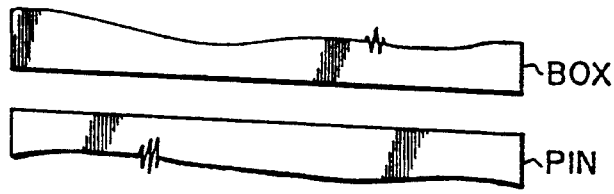
FIG. 10B schematically represents the box and pin sealing area relationship giving rise to the characteristic depicted in FIG. 10A.
Figure 11A:
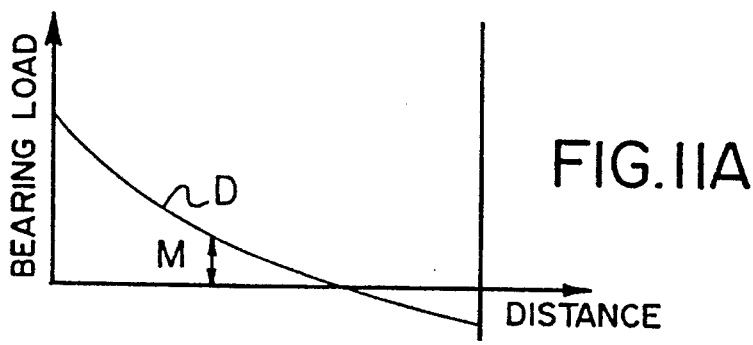
FIG. 11A is a graph showing a representative seal bearing load vs. distance characteristic for a coupling box seal/pin seal relationship in which both box and pin sealing surfaces have the same steeply sloped taper.
Figure 11B:
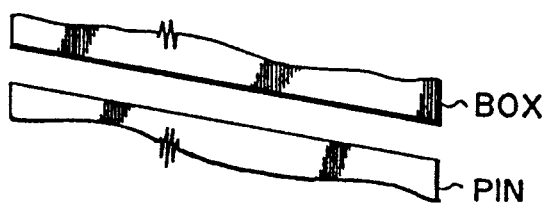
FIG. 11B schematically represents the box and pin sealing area relationship giving rise to the characteristic depicted in FIG. 11A.

FIGS. 11A and 11b reveal that the design of FIG. 10B can become totally unacceptable if the degree of taper of the mating sealing surfaces is sufficiently large. Where the sealing surfaces are steeply inclined, the bearing load diminishes to zero well before the distal end of the pin sealing surface is reached, and is above design minimum M only over an unacceptably short sealing area. The falling of curve D below the abscissa indicates absence of surface contact between the box and pin sealing areas. (In fact, the bearing load cannot fall below zero, so the portion of the curve below the abscissa is imaginary).

If the tapers of pin and box sealing surfaces are greatly mismatched, the sealing portions of the pin and box tend to lose surface contact and bearing force at the proximal end of the sealing portion of the pin, corresponding to the outermost end of the sealing area of the box. The highest bearing force in the case of too much mismatch is to be found at the distal end of the pin, where adequate contact between the pin member and box member threaded portions can occur. This is manifest in the graph of FIG. 12A, in which curve E1 reflects the increase in bearing load from its minimum near the proximal end of the pin sealing surface (undesirably, below design load M) to a maximum at the distal pin end, relative to the greatly mismatched taper design of FIG. 12B. Curve E2 illustrates a mismatch sufficiently severe that contact between the pin and box sealing areas is lost at the proximal end of the pin. (Again, the portion of the curve below the abscissa is imaginary).

Figure 12A:
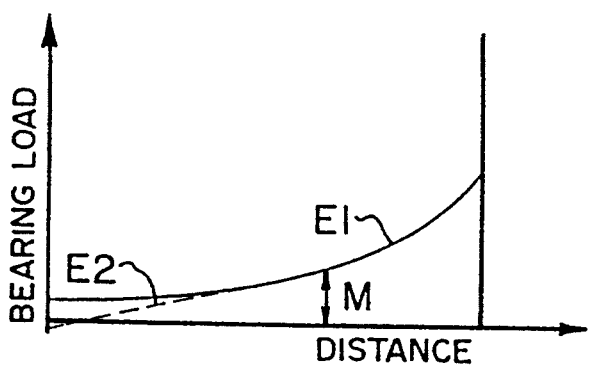
FIG. 12A is a graph showing a representative seal bearing load vs. distance characteristic for a coupling box seal/pin seal relationship in which the box and pin seal are greatly mismatched.
Figure 12B:
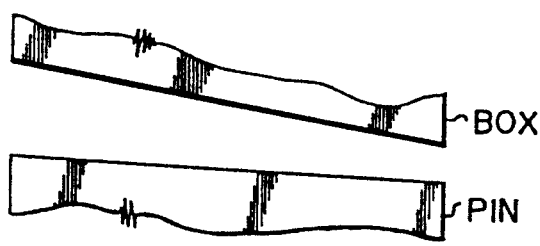

By contrast to FIG. 12B, the tapers of both pin and box sealing areas are relatively gentle in the design of FIG. 9B, albeit slightly mismatched. If however the sealing surfaces were sharply sloped, as in FIG. 11B, the bearing load at the distal end of the pin sealing surface would tend to fall below acceptable design minimum value M. So the invention should be practised under the condition that design minimum bearing (sealing) force M is exceeded throughout the axial length of the mating sealing surfaces. Beyond one extreme of the preferred range, force M would be just slightly exceeded at the distal end of the pin. That would offer little or no improvement over the FIG. 10B configuration. Just beyond the other extreme of the range, as one approaches the FIG. 8B design, it becomes impossible to fit the pin into the box without severe galling. The invention is optimally practised about half-way between these extremes.

In all the graphs of FIGS. 8A through 12A, the premise has been assumed that at any point along the effective sealing area, the bearing load should always be equal to or above some predetermined minimum acceptable design bearing load M, if at all possible, so that no matter where one looks at bearing load, one will find that predetermined minimum equalled or exceeded. This minimum is equalled or exceeded at all points along each of the curves A, B1, B2, B3 and C. The criterion cannot be obtained in the too sharply sloped configuration of FIG. 11B, and it may not be obtained in the FIG. 12B configuration. The minimum value M is desirably appreciably exceeded at both ends of the sealing area, as illustrated in curves A, B1, B2 and B3, since leaks tend to develop at the ends. The configuration is which this desideratum is optimally obtained is the slightly mismatched taper configuration of FIG. 9B, with further improvement available if thread interference lags seal interference during make-up, and if slight thread taper mismatch is selected as previously discussed.

In all of FIGS. 9B through 12B, it is assumed that the degree of taper on the internal sealing surface of the box is equal to or exceeds the degree of taper on the sealing portion of the pin. A mismatch in the other sense, in which the taper in the box is less pronounced than the taper on the pin, would be quite unsatisfactory, because then the pin member would have difficulty adequately penetrating the box member, and undesirably high interference would result.

Note that if the distal end of the pin member is damaged in handling, such that an insufficient bearing load is present at that end, there will nevertheless be an adequately high proximal pin end bearing load, if the slightly mismatched taper arrangement according to the invention is selected. The invention, however, gives the additional advantage that if the distal end of the threaded portion of the pin is only slightly damaged, then hand dressed, an adequately tight seal is created at the distal end as well as the proximal end, whilst in between, the sealing force is everywhere higher than the minimum bearing force for which the seal has been designed.

The FIG. 9B selection of box and pin sealing area tapers tends to be optimally resistant to surge stresses, and tends to afford optimal opportunity for hand-dressing repair of damaged sealing area surfaces.

As mentioned, with reference to a sealing area gauge point chosen intermediate the ends of the contacting sealing areas, the degree of mismatch should be kept less than the gauge-point nominal interference between the box and pin sealing areas, in order to obtain a curve B1, B2 or B3 bearing load vs. distance characteristic rather than a curve E1 characteristic. The nominal interference will be related to the yield strength of the steel. A mismatch of the order of 50 or 60% of nominal interference is likely to be optimal.

Due regard must be paid to permitted tolerances in the chosen design of coupling according to the invention. Tolerances should be chosen for both sealing surfaces and load threads that tend to minimize risk of galling of the sealing surfaces during make-up of the coupling. On the other hand, tolerances should not be chosen that would make possible a reduction of bearing load throughout the effective sealing area below design minimum. The design minimum normally should be at least equal to the expected pressure differential at the yield strength of the selected steel. More tolerance is permitted for higher grade steel than for lower grade steel.

EXAMPLE 1

Pin and box members according to the foregoing description were prepared for use in couplings for 7-inch pipe having wall thickness ratings of 23 and 26 pounds per foot. Such a coupling is intended for use with well casings where steam injection within the casing is required. Depending upon the length of pipe and the expected pressures, a 55,000 psi minimum yield strength or 80,000 psi minimum yield strength steel may be selected. Temperatures up to 650 degrees Fahrenheit must be withstood, and axial tensile and compressive loads are expected to occur which approach or even exceed the actual yield strength of the material in the pipe body. The coupling was designed to withstand this axial loading without failure whilst maintaining adequate resistance to leakage from internal pressures ranging up to actual yield strength of the pipe wall.

The coupling was prepared with approximately twelve complete turns of threads tapered at 0.104 inches per inch for the pin and box, and having a pitch of 0.200 inches per revolution. Of the twelve threads on the pin, seven were perfect threads, and the other five were partial threads diminishing to the vanish point 13 as illustrated in FIG. 1. The flank face orientation for the pin threading was the same as that for the box threading, namely −3 degrees for the load flank and +18 degrees for the stab flank.

For the sealing surfaces, the microgrooves were formed by a 3/64 inch radius turning tool fed at an axial feed rate selected within the range of about 0.008 inches to 0.015 inches per revolution. If the coupling will be used in a gaseous environment, such as a heavy oil steam environment, a feed rate nearer the lower value (0.008 inches/revolution) is preferred. For leak resistance in a conventional oil environment, a feed rate nearer the higher value (0.015 inches/revolution) is preferred. The total sealing length of the pin member was selected to be 0.900 inches; the sealing portion in the box member would be slightly smaller, depending upon whether the FIG. 2 or FIG. 3 embodiment is chosen. The microgrooves at the 0.008 inches/revolution pitch are about 0.0002 inch in depth and at 0.015 inches/revolution pitch are about 0.0006 inch deep. The crests tend to be flattened upon tightening the coupling, perhaps removing at least about 20% from the trough depth, and more in the vicinity of the area of highest bearing pressure.

The gauge points for the pin and box were selected as follows:

The pin and box thread gauge position was selected to be at a point axially where the threads in the made-up (assembled) position of pin and box members were directly coincident and spaced from the last full-depth thread (after which only partial flank depth occurs, diminishing towards the vanish point). This axial position was also selected so as to afford greater than zero interference at the ends of the threaded portions in the vicinity of the outer end of the box, less as one progresses inwardly (because of the load thread taper mismatch between box and pin).

The pin seal gauge point 16 was arbitrarily chosen to be ⅜ (0.375) inch from the distal end of the pin. The box seal gauge point 42 was also arbitrarily selected to be 0.375 inch from the box seat 46 (see FIG. 2). The calculated minimum interference load M was then based upon the nominal interference (0.019 inch) at a location 0.375 inch from the distal end of the pin which coincides exactly with gauge point of the box seal. Selecting the gauge point is somewhat arbitrary on the basis that to stop leakage, the interference at any point along the active seal must be equal to or greater than the minimum seal interference (0.012" in this case). Since the coupling has unequal seal tapers for the pin and the box, in this case it is more convenient to locate the gauge points at the same axial location from the torque shoulder.

The pin sealing area taper was 0.104 inches per inch on diameter, the same as that of the thread pitch line of the threads, whilst the box sealing area taper was 0.1146 inches per inch on diameter. This is a mismatch of 0.0106 inches per inch on diameter, or less than the minimum gauge point sealing area interference of 0.012 inches on diameter. The tolerance of the pin thread and seal at the gauge point was ±0.004 inches on diameter, and that of the box was ±0.003 inches on diameter.

In the Example 1 configuration, there was at least some thread interference in the vicinity of the seal area; consequently the sealing force vs. distance characteristic resembled that of FIG. 9A.

EXAMPLE 2

The parameters, dimensions etc. were the same as for Example 1, except that the box seal taper was 0.110 inches per inch on diameter, that the box thread taper was selected to be 0.095 inches per inch, and the box seal gauge point 42 was selected to be 0.500 inch from the box seat 46.

In the Example 2 configuration, there was no thread interference in the vicinity of the sealing area even when the coupling was made up. And there was slight mismatch between box and pin thread taper, the pin taper being slightly more inclined to the axis than the box taper, with the result that the sealing force vs. distance characteristic resembled that of FIG. 9D.

Terminology

The scope of the invention is as presented in the appended claims.

In the appended claims:

1. The term "connection" includes a coupling.
2. The phrase "relatively shallow" with reference to the slopes of the frusto-conical sealing surfaces of the box and pin implies that:
   (i) the taper is not so great as to give a bearing-load-vs.-axial-distance characteristic similar to that of FIG. 11A;
   (ii) the taper is not so great as to create a significant risk of loss of seal due to thermal cycling of the coupling (i.e., alternate stressing of the coupling in tension and compression);
   (iii) the taper is not so great as to reduce distal-end pin wall thickness unacceptably; and
   (iv) the taper is nevertheless sufficient to avoid galling of the sealing surfaces during assembly of the coupling.
3. The term "slightly less" with reference to the slope of the frusto-conical sealing surface of the pin relative to that of the box implies that:
   (i) the mismatch is sufficient to avoid a bearing-load-vs.-axial-distance characteristic similar to that of FIG. 10A;
   (ii) the mismatch is not so great as to generate an effective contacting sealing area between the box and the pin that is unduly short in the axial direction;
   (iii) the mismatch is not so great as to give a bearing-load-vs.-axial-distance characteristic similar to that of FIG. 12A; and
   (iv) the mismatch is not so great as to cause undue tilt of the pin during assembly.

What is claimed is:

1. A pipe connection of the type having a female component and a mating male component, each matingly threaded for connection therebetween, and each provided with a sealing area adjacent the threaded area, the sealing area of the coupling components being formed as mating frusto-conical surfaces each having a preselected gauge point intermediate the axial ends of the sealing area, at least one of said frusto-conical surfaces having controlled surface roughness; the respective sealing areas of the components being in axially aligned sealing engagement when the pipe connection has been assembled; characterized in that:

2. A pipe connection as defined in claim 1, wherein the mismatch between the slopes of the frusto-conical sealing surfaces of the male and female components in inches per inch is less than the nominal interference in inches at the gauge points of the said sealing surfaces.
   (a) the slopes of the frusto-conical sealing surfaces are each relatively shallow;
   (b) the slope of the frusto-conical sealing surface of the male component is slightly less than that of the frusto-conical sealing surface of the female component; and
   (c) the sealing bearing load relative to axial distance of the contacting sealing surfaces of the assembled components being selected to lie above a preselected design minimum but below force levels at which galling occurs, said bearing load of the assembled components qualitatively simulating that of a pair of mating shrunk-fit circular cylindrical sealing surfaces.

3. A pipe connection as claimed in claim 2 wherein the mismatch in inches per inch does not exceed about 70% of the nominal interference in inches.

4. A pipe connection as defined in claim 2, wherein the slope of the frusto-conical sealing surface of the male component is substantially the same as the slope of the thread pitch line of the male component.

5. A pipe connection as defined in claim 2, wherein prior to assembly, to at least one of the sealing surfaces is applied a high-temperature high-solids sealing lubricant containing mashable solid particles.

6. A pipe connection as defined in claim 2, wherein the load flank faces of the load threads of both the male and female components are negatively inclined to the radial.

7. A pipe connection as defined in claim 6, wherein the angle of negative inclination of the load flank faces does not exceed about 10 degrees, and the sum of the load flank angle and stab flank angle of the threads to the radial is at least equal to about 15 degrees.

8. A pipe connection as defined in claim 2, wherein the female component is provided with an interior torque shoulder forming an annular seat engageable by and mating with the distal end of the male component.

9. A pipe connection as defined in claim 8, wherein the face of the annular seat is negatively inclined to the radial.

10. A pipe connection as defined in claim 1, wherein the load flank faces of the load threads of both the male and female components are negatively inclined to the radial.

11. A pipe connection as defined in claim 10, wherein the angle of negative inclination of the load flank faces does not exceed about 10 degrees, and the sum of the load flank angle and stab flank angle of the threads to the radial is at least equal to about 15 degrees.

12. A pipe connection of the type having a female component and a mating male component, each matingly threaded for connection therebetween, and each provided with a sealing area adjacent the threaded area, the sealing area of the coupling components being formed as mating frusto-conical surfaces each having a preselected gauge point intermediate the axial ends of the sealing area, at least one of said frusto-conical surfaces having controlled surface roughness; the respective sealing areas of the components being in axially aligned sealing engagement when the pipe connection has been assembled; characterized in that:
(a) the elopes of the frusto-conical sealing surfaces are each relatively shallow;
(b) when the connection is being assembled, interference between the sealing surfaces occurs before any occurrence of any radially-directed interference of the load threads of the male and female components in the vicinity of the sealing surfaces;
(c) upon complete assembly of the connection, any interference between the load threads is insufficient to tend to pry the sealing surfaces apart to an extent that would reduce the sealing bearing load below the minimum design value for the connection; and
(d) the sealing bearing load relative to axial distance of the contacting sealing surfaces of the assembled components being selected to lie above a preselected design minimum but below force levels at which galling occurs, said bearing load of the assembled components qualitatively simulating that of a pair of mating shrunk-fit circular cylindrical sealing surfaces.

13. A pipe connection as defined in claim 12, wherein upon complete assembly of the connection, there is no thread interference creating a radial force between the said frusto-conical sealing surfaces.

14. A pipe connection of the type having a female component and a mating male component, each matingly threaded for connection therebetween, and each provided with a sealing area adjacent the threaded area, the sealing area of the coupling components being formed as mating frusto-conical surfaces each having a preselected gauge point intermediate the axial ends of the sealing area, at least one of said frusto-conical surfaces having controlled surface roughness; the respective sealing areas of the components being in axially aligned sealing engagement when the pipe connection has been assembled; characterized in that:
(a) the slopes of the frusto-conical sealing surfaces are each relatively shallow;
(b) the slope of the frusto-conical sealing surface of the male component is slightly less than that of the frusto-conical sealing surface of the female component;
(c) the sealing bearing load relative to axial distance of the contacting sealing surfaces of the assembled components being selected to lie above a preselected design minimum but below force levels at which galling occurs, said bearing load qualitatively simulating that of a pair of mating shrunk-fit circular cylindrical sealing surfaces;
(d) when the connection is being assembled, interference between the sealing surfaces occurs before any occurrence of any radially-directed interference of the load threads of the male and female components in the vicinity of the sealing surfaces;
(e) upon complete assembly of the connection, any interference between the load threads is insufficient to tend to pry the sealing surfaces apart to an extent that would reduce the sealing bearing load below the minimum design value for the connection.

15. A pipe connection as defined in claim 14, wherein upon complete assembly of the connection, there is no thread interference creating a radial force between the said frusto-conical sealing surfaces.

16. A pipe connection as defined in claim 14, wherein the mismatch in inches per inch between the slopes of the frusto-conical sealing surfaces of the male and female components is less than the nominal interference in inches at the gauge points of the said sealing surfaces.

17. A pipe connection as claimed in claim 16 wherein the mismatch in inches per inch does not exceed about 70% of the nominal interference in inches.

18. A pipe connection as defined in claim 16, wherein the load flank faces of the load threads of both the male and female components are negatively inclined to the radial.

19. A pipe connection as defined in claim 18, wherein the slope of the frusto-conical sealing surface of the male component is substantially the same as the slope of the thread pitch line of the male component.

20. A pipe connection as defined in claim 18, wherein the angle of negative inclination of the load flank faces does not exceed about 10 degrees, and the sum of the load flank angle and stab flank angle of the threads to the radial is at least equal to about 15 degrees.

21. A pipe connection as defined in claim 20, wherein the female component is provided with an interior torque shoulder forming an annular seat engageable by and mating with the distal end of the male component.

22. A pipe connection as defined in claim 21, wherein the face of the annular seat is negatively inclined.

23. A pipe connection as defined in claim 22, wherein prior to assembly, to at least one of the sealing surfaces is applied a high-temperature high-solids sealing lubricant containing graphite particles.

24. For use in a pipe connection of the type having a female component and a mating male component, each matingly threaded for connection therebetween, and each provided with a sealing area adjacent the threaded area, the sealing area of the coupling components being formed as mating frusto-conical surfaces each having a preselected gauge point intermediate the axial ends of the sealing area, at least one of said frusto-conical surfaces having controlled surface roughness; the respective sealing areas of the components being in axially aligned sealing engagement when the pipe connection has been assembled; a female component of the foregoing type characterized in that:
(a) the slopes of the frusto-conical sealing surface thereof is relatively shallow;
(b) the slope of the frusto-conical sealing surface thereof is slightly greater than that of the frusto-conical sealing surface of the mating male component; and
(c) the sealing bearing load on the sealing surface thereof relative to axial distance of the contacting sealing surfaces of the assembled female and male components being selected to lie above a preselected design minimum but below force levels at which galling occurs, said bearing load when the pipe connection has been assembled qualitatively simulating that of a pair of mating shrunk-fit circular cylindrical sealing surfaces.

25. A female component for a female component for a pipe connection as defined in claim 24, wherein the mismatch between the slopes of the frusto-conical sealing surfaces of the male and female components is less than the nominal interference in inches at the gauge points of the said sealing surfaces when the connection has been assembled.

26. A pipe connection as defined in claim 24, wherein the load flank faces of the load threads of both the male and female components are negatively inclined to the radial.

27. A pipe connection as defined in claim 24, wherein the load flank faces of the load threads of both the male and female components are slightly negatively inclined to the radial, the angle of negative inclination of the load flank faces not exceeding about 10 degrees.

28. A female component for a pipe connection as defined in claim 24, wherein the mismatch between male and female thread pitch line angle is less than that which would afford 50% contact between the distal threads of the male component and the mating threads of the female component.

29. For use in a pipe connection of the type having a female component and a mating male component, each matingly threaded for connection therebetween, and each provided with a sealing area adjacent the threaded area, the sealing area of the coupling components being formed as mating frusto-conical surfaces, at least one of said frusto-conical surfaces having controlled surface roughness; the respective sealing areas of the components being in axially aligned sealing engagement when the pipe connection has been assembled; a female component of the foregoing type characterized in that:
  (a) the slopes of the frusto-conical sealing surface thereof is relatively shallow;
  (b) when the connection is being assembled, interference between the sealing surfaces occurs before any occurrence of any radially-directed interference of the load threads of the male and female components in the vicinity of the sealing surfaces;
  (c) upon complete assembly of the connection, any interference between the load threads is insufficient to tend to pry the sealing surfaces apart to an extent that would reduce the sealing bearing load below the minimum design value for the connection; and
  (d) the sealing bearing load relative to axial distance of the contacting sealing surfaces of the assembled components being selected to lie above preselected design minimum but below force levels at which galling occurs, said bearing load of the assembled components qualitatively simulating that of a pair of mating shrunk-fit circular cylindrical sealing surfaces.

30. For use in a pipe connection of the type having a female component and a mating male component, each matingly threaded for connection therebetween, and each provided with a sealing area adjacent the threaded area, the sealing area of the coupling components being formed as mating frusto-conical surfaces, at least one of said frusto-conical surfaces having controlled surface roughness: the respective sealing areas of the components being in axially aligned sealing engagement when the pipe connection has been assembled; a female component of the foregoing type characterized in that:
  (a) the slopes of the frusto-conical sealing surface thereof is relatively shallow;
  (b) the slope of the frusto-conical sealing surface thereof is slightly greater than that of the frusto-conical sealing surface of the mating male component;
  (c) when the connection is being assembled, interference between the sealing surfaces occurs before any occurrence of any radially-directed interference of the load threads of the male and female components in the vicinity of the sealing surfaces:
  (d) upon complete assembly of the connection, any interference between the load threads of the female component and the mating male component is insufficient to tend to pry the sealing surfaces apart to an extent that would reduce the sealing bearing load below the minimum design value for the connection and
  (e) the sealing bearing load relative to axial distance of the contacting sealing surfaces of the assembled components being selected to lie above a preselected design minimum but below force levels at which galling occurs, said bearing load of the assembled components qualitatively simulating that of a pair of mating shrunk-fit circular cylindrical sealing surfaces.

* * * * *

UNITED STATES PATENT AND TRADEMARK OFFICE
CERTIFICATE OF CORRECTION

PATENT NO. : 5,348,350

DATED : September 20, 1994

INVENTOR(S) : Thomas L. Blose, et al

It is certified that error appears in the above-indentified patent and that said Letters Patent is hereby corrected as shown below:

Column 14, line 61, change "condiderably" to --considerably--.

Column 16, line 17, change "lib" to --11B--.

Column 20, lines 24 to 37 inclusive, should be deleted from their position following claim 2 and should follow the colon at line 18 of column 20.

Column 21, line 18, change "elopes" to --slopes--.

Column 23, line 12, before "pipe" insert --female component for a--.

Column 23, line 16, before "pipe" insert --female component for a--.

Column 24, line 32, change the colon (:) to a semicolon (;).

UNITED STATES PATENT AND TRADEMARK OFFICE
CERTIFICATE OF CORRECTION

PATENT NO. : 5,348,350
DATED : September 20, 1994
INVENTOR(S) : Thomas L. Blose, et al It is certified that error appears in the above-indentified patent and that said Letters Patent is hereby corrected as shown below:

Column 24, line 39, before "and" insert a semicolon (;).

Signed and Sealed this

Fourth Day of April, 1995

Attest:

BRUCE LEHMAN

Attesting Officer

Commissioner of Patents and Trademarks